(12) United States Patent
Kim et al.

(10) Patent No.: US 12,566,990 B2
(45) Date of Patent: Mar. 3, 2026

(54) SYSTEM AND METHOD FOR IMPROVED VACUUM IN COMPACT PACKAGES

(71) Applicants: IonQ, Inc., College Park, MD (US); Duke University, Durham, NC (US)

(72) Inventors: Jungsang Kim, Durham, NC (US); Peter Lukas Wilhelm Maunz, Albuquerque, NM (US)

(73) Assignees: IonQ, Inc., College Park, MD (US); Duke University, Durham, NC (US)

( * ) Notice: Subject to any disclaimer, the term of this patent is extended or adjusted under 35 U.S.C. 154(b) by 381 days.

(21) Appl. No.: 18/185,834

(22) Filed: Mar. 17, 2023

(65) Prior Publication Data

US 2023/0297871 A1      Sep. 21, 2023

Related U.S. Application Data

(60) Provisional application No. 63/321,475, filed on Mar. 18, 2022.

(51) Int. Cl.
   *G06N 10/40*          (2022.01)
(52) U.S. Cl.
   CPC .................................... *G06N 10/40* (2022.01)
(58) Field of Classification Search
   CPC .... G06N 10/40; B23K 2101/36; B23K 31/02; F04B 37/02
   See application file for complete search history.

(56) References Cited

U.S. PATENT DOCUMENTS

2006/0063462 A1      3/2006  Ding et al.

FOREIGN PATENT DOCUMENTS

JP         2003297562  A     10/2003
WO         2022011290  A1      1/2022

OTHER PUBLICATIONS

International Search Report and Written Opinion issued in International Patent Application No. PCT/US2023/015537, mailed Jul. 9, 2024, 13 pages.

*Primary Examiner* — Robert H Kim
(74) *Attorney, Agent, or Firm* — ARENTFOX SCHIFF LLP

(57)          ABSTRACT

Aspects of the present disclosure relate generally to systems and methods for use in the implementation and/or operation of quantum information processing (QIP) systems, and more particularly, to methods and systems for improving vacuum in compact room temperature packages. An exemplary method for preparing a vacuum chamber for a QIP system includes inserting, into a processing vacuum chamber, a lid having a shadow mask on an optical window, coating the inside of the lid with a getter material; removing the shadow mask from the optical window; and providing an ion trap package in the processing vacuum chamber and welding the lid on a top of the ion trap package to prepare the vacuum chamber.

16 Claims, 5 Drawing Sheets

400

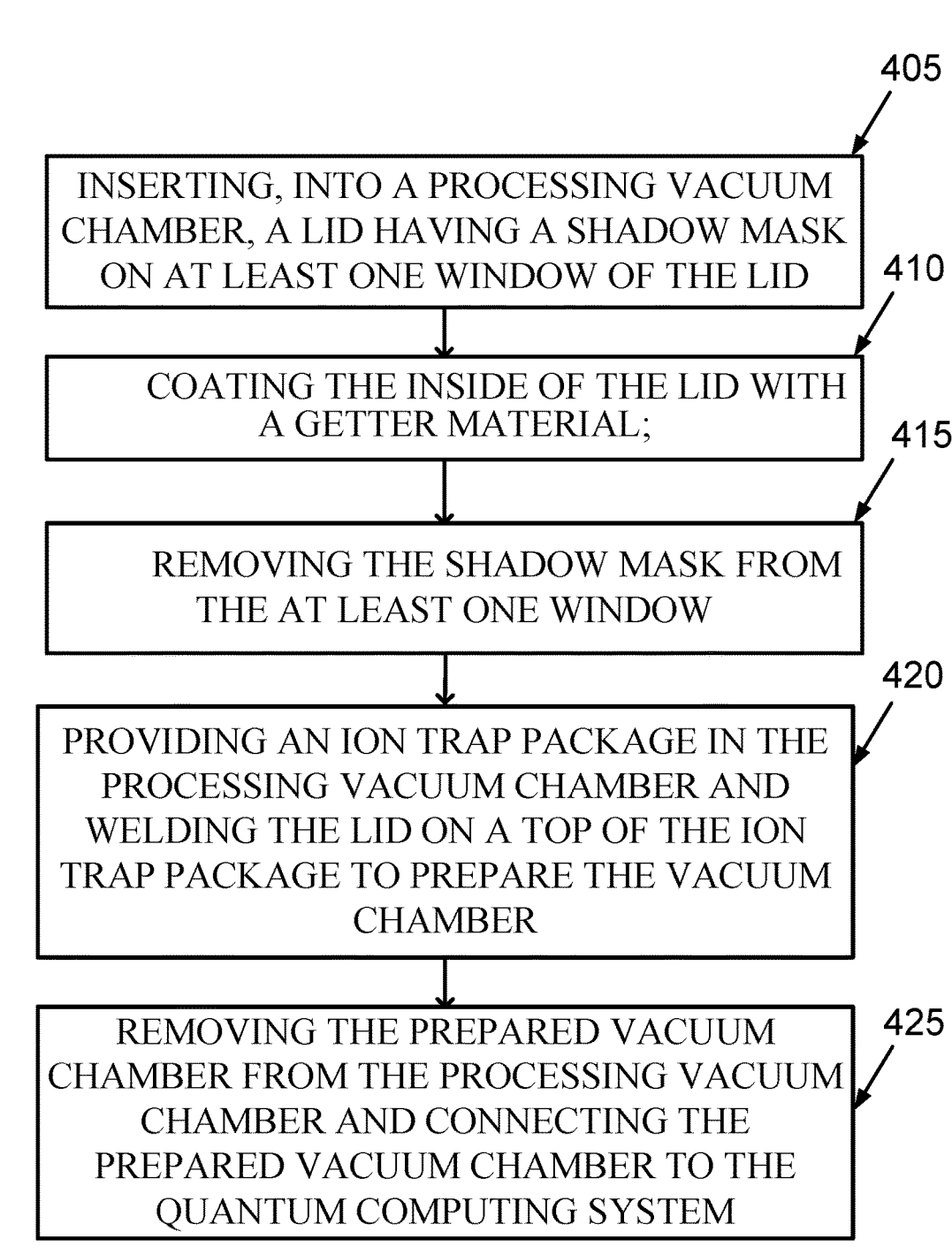

405

INSERTING, INTO A PROCESSING VACUUM CHAMBER, A LID HAVING A SHADOW MASK ON AT LEAST ONE WINDOW OF THE LID

410

COATING THE INSIDE OF THE LID WITH A GETTER MATERIAL;

415

REMOVING THE SHADOW MASK FROM THE AT LEAST ONE WINDOW

420

PROVIDING AN ION TRAP PACKAGE IN THE PROCESSING VACUUM CHAMBER AND WELDING THE LID ON A TOP OF THE ION TRAP PACKAGE TO PREPARE THE VACUUM CHAMBER

425

REMOVING THE PREPARED VACUUM CHAMBER FROM THE PROCESSING VACUUM CHAMBER AND CONNECTING THE PREPARED VACUUM CHAMBER TO THE QUANTUM COMPUTING SYSTEM

FIG. 4

SYSTEM AND METHOD FOR IMPROVED VACUUM IN COMPACT PACKAGES

CROSS REFERENCE TO RELATED APPLICATIONS

The current application claims priority to U.S. Patent Provisional Application No. 63/321,475, filed Mar. 18, 2022, the entire contents of which are hereby incorporated by reference.

TECHNICAL FIELD

Aspects of the present disclosure relate generally to systems and methods for use in the implementation and/or operation of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

Currently, operation of trapped ion has been implemented in compact vacuum chambers operating at room temperature. The vacuum level inside the vacuum enclosure has been estimated using collision rates measured by monitoring the transition of the ion position between two trap locations connected by a small energy barrier, or by monitoring the re-ordering events in a long ion chain. The resulting vacuum levels (e.g., $\sim2\times10^{-11}$ Torr) is on par with those available in a conventional ultra-high-vacuum (UHV) chamber. However, to operate a large-scale trapped ion quantum computer reliably, the vacuum levels need to be improved by a few orders of magnitude in order to keep background collision rates low enough to minimize ion chain reordering events and loss of ions from the trap.

It is therefore important to develop new techniques that improve the design, fabrication, implementation, and/or control of different QIP systems used as quantum computers or quantum simulators, and particularly for those QIP systems that include vacuum chambers operating at room temperature and that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of methods and systems for improving vacuum in compact room temperature packages, including using such methods and systems in QIP systems. Enabling operation at room temperature allows the complete quantum computing system to avoid the use of a cryogenic system, which facilitates a smaller overall system with lower power requirements that is easier to deploy.

In an exemplary aspect, a method is provided for preparing a vacuum chamber for a quantum computing system. In this aspect, the method includes inserting, into a processing vacuum chamber, a lid having a shadow mask on at least one window of the lid; coating the inside of the lid with a getter material; removing the shadow mask from the at least one window; and providing an ion trap package in the processing vacuum chamber and welding the lid on a top of the ion trap package to prepare the vacuum chamber.

Moreover, in an exemplary aspect, the method may include removing the prepared vacuum chamber from the processing vacuum chamber and connecting the prepared vacuum chamber to the quantum computing system.

In another exemplary aspect, the inserting of the lid into the processing vacuum chamber further comprising load locking without venting the processing vacuum chamber.

In another exemplary aspect, the method may include surface processing the ion trap package before the lid is welded to the top thereof to reduce anomalous heating.

In another exemplary aspect, the providing of the ion trap package further comprises mounting the ion trap on a ceramic package to provide the ion trap package outside the processing vacuum chamber and inserted the ion trap package into the processing vacuum chamber.

In another exemplary aspect, the method may include sealing, by a metal sealant, a groove of the lid to a ring frame on the ceramic package.

In another exemplary aspect, the method may include removing, by an active ion pump integrated with the lid, inert gas molecules from the vacuum chamber. Moreover, the removing of the inert gas molecules may comprise ionizing the inert gas molecules and driving the inert gas molecules into a surface of the lid that is coated by the getter material.

In another exemplary aspect, the method may include applying at least one of a magnetic field and electric field against the surface of the lid that is coated by the getter material.

In another exemplary aspect, the method may include striking a local plasma using laser ablation to drive the inert gas molecules into the surface of the lid that is coated by the getter material.

In another exemplary aspect, the coating of the lid with the getter material comprises conditioning an inner surface of the lid to be an adsorbing surface by sublimating the getter material on the inner surface. Moreover, the coating of the lid with the getter material may comprise activating the getter material to spread over an inner surface of the lid to be an adsorbing surface.

In another exemplary aspect, the getter material is at least one of a non-evaporable getter (NEG), titanium (Ti) and barium (Ba).

In another exemplary aspect, the method may include configuring the ion trap package to operate a quantum computing operation at room temperature by providing the ion trap package to prepare the vacuum chamber.

In another exemplary aspect, the method may include reducing a pressure in the processing vacuum chamber before coating the lid with the getter material.

In another exemplary aspect, the method may include the connecting of the prepared vacuum chamber to the quantum computing system further comprises configuring the prepared vacuum chamber as a ground connection for the ion trap package.

In yet an additional exemplary aspect, a quantum information processing (QIP) system is provided that includes an interposer chip; an ion trap mounted to the interposer chip to provide an ion trap package, the ion trap including a plurality of trapped ions; a vacuum chamber having a lid with at least one window, with the lid being coupled to a top of the ion trap package that is opposite the interposer chip; and a coating material that is coated to an inner surface of the lid facing the ion trap package.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4 illustrates a flowchart for manufacturing a vacuum chamber for the QIP system in accordance with exemplary aspects of this disclosure.

DETAILED DESCRIPTION

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well known components.

Solutions to the issues described above are explained in more detail in connection with FIGS. 1-5, with FIGS. 1-3 providing a general implementation of QIP systems or quantum computers, and more specifically, of atomic-based QIP systems or quantum computers. The exemplary system and method provides for improved vacuum levels for the vacuum enclosures used in such QIP systems.

Figure 1:
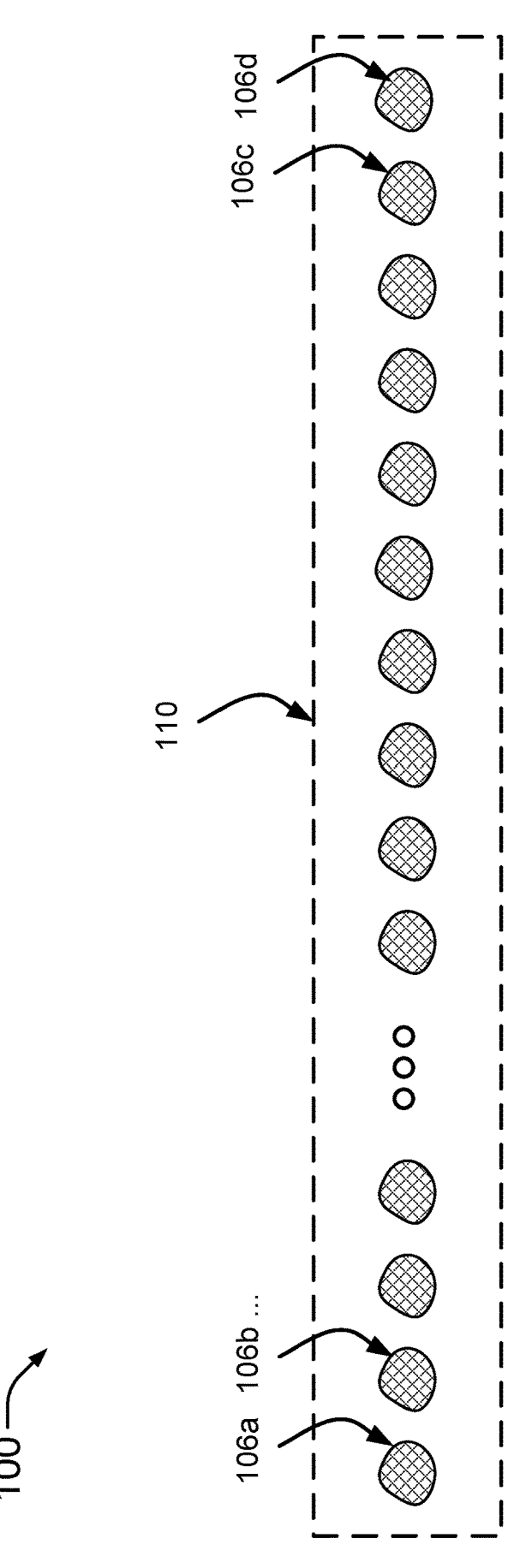
FIG. 1 illustrates a view of atomic ions a linear crystal or chain in accordance with exemplary aspects of this disclosure.
Figure 2:
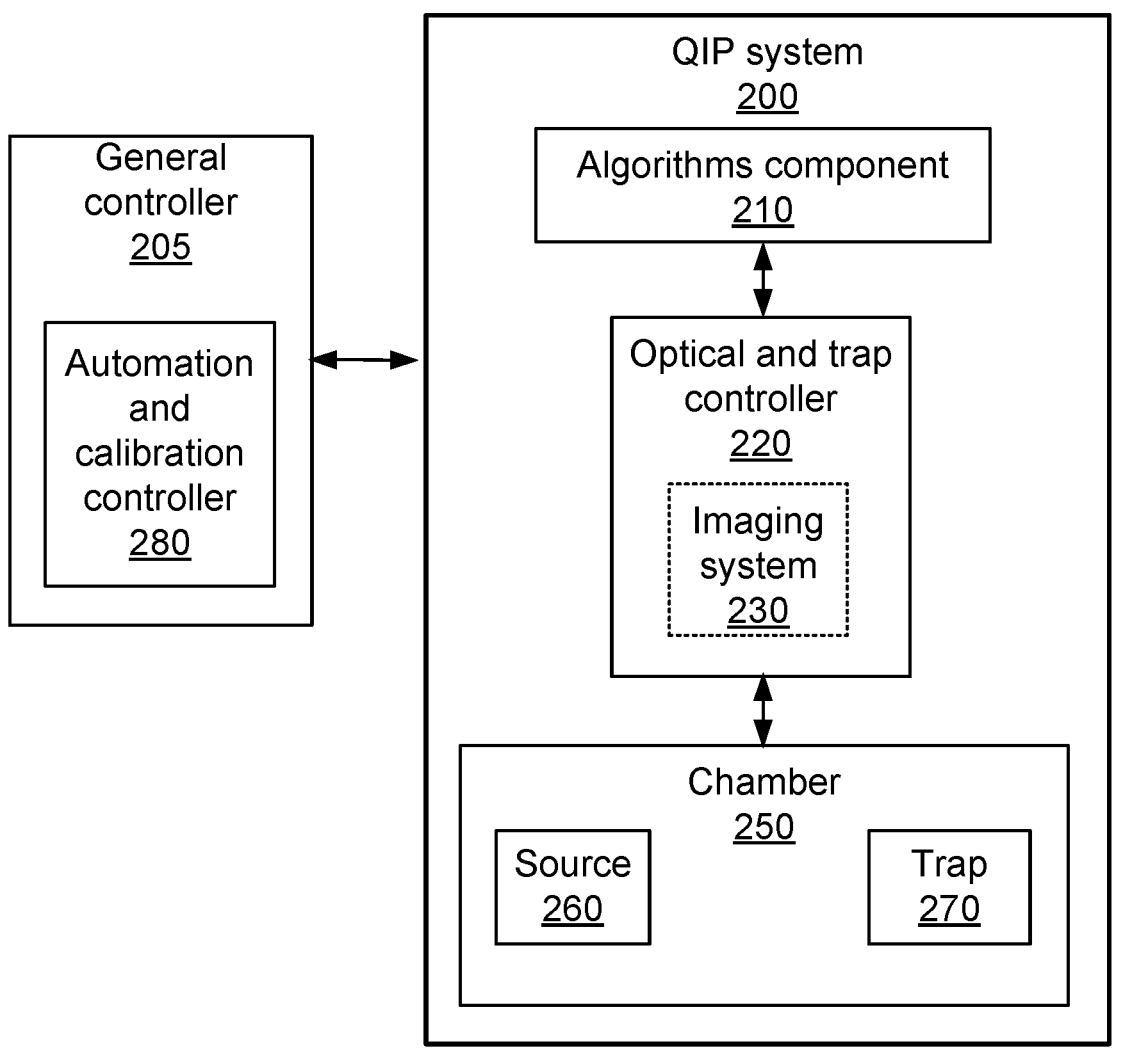
FIG. 2 illustrates an example of a quantum information processing (QIP) system in accordance with exemplary aspects of this disclosure.

In general, FIG. 1 shown below illustrates a diagram 100 with multiple atomic ions 106 (e.g., atomic ions 106a, 106b, . . . , 106c, and 106d) trapped in a linear crystal or chain 110 using a trap (the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The atomic ions 106 may be provided to the trap as atomic species for ionization and confinement into the chain 110.

In the example shown in FIG. 1, the trap includes electrodes for trapping or confining multiple atomic ions into the chain 110 that are laser-cooled to be nearly at rest. The number of atomic ions (N) trapped can be configurable and more or fewer atomic ions may be trapped. The atomic ions can be Ytterbium ions (e.g., $^{171}Yb^+$ ions), for example. The atomic ions are illuminated with laser (optical) radiation tuned to a resonance in $^{171}Yb^+$ and the fluorescence of the atomic ions is imaged onto a camera or some other type of detection device. In this example, atomic ions may be separated by about 5 microns (µm) from each other, although the separation may be smaller or larger than 5 µm. The separation of the atomic ions is determined by a balance between the external confinement force and Coulomb repulsion and does not need to be uniform. Moreover, in addition to atomic Ytterbium ions, neutral atoms, Rydberg atoms, different atomic ions or different species of atomic ions may also be used. The trap may be a linear RF Paul trap, but other types of confinement may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 shown below is a block diagram that illustrates an example of a QIP system 200 in accordance with various aspects of this disclosure. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations.

As illustrated in FIG. 2, a general controller 205 is provided and configured to perform various control operations of the QIP system 200. Instructions for the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200.

The QIP system 200 may include an algorithms component 210 that may operate with other parts of the QIP system 200 to perform quantum algorithms or quantum operations, including a stack or sequence of combinations of single qubit operations and/or multi-qubit operations (e.g., two-qubit operations) as well as extended quantum computations. As such, the algorithms component 210 may provide instructions to various components of the QIP system 200 (e.g., to the optical and trap controller 220) to enable the implementation of the quantum algorithms or quantum operations. The algorithms component 210 may receive information resulting from the implementation of the quantum algorithms or quantum operations and may process the information and/or transfer the information to another component of the QIP system 200 or to another device for further processing.

The QIP system 200 may include an optical and trap controller 220 that controls various aspects of a trap 270 in a chamber 250, including the generation of signals to control the trap 270, and controls the operation of lasers and optical systems that provide optical beams that interact with the atoms or ions in the trap. The chamber 250 is an example of the vacuum chamber described herein with improved vacuum levels to minimize gas collision rates, the details of which are described below.

When used to confine or trap ions, the trap 270 may be referred to as an ion trap. The trap 270, however, may also be used to trap neutral atoms, Rydberg atoms, different atomic ions or different species of atomic ions. The lasers and optical systems can be at least partially located in the optical and trap controller 220 and/or in the chamber 250. For example, optical systems within the chamber 250 may refer to optical components or optical assemblies.

The QIP system 200 may include an imaging system 230. The imaging system 230 may include a high-resolution imager (e.g., CCD camera) or other type of detection device (e.g., photomultiplier tube or PMT) for monitoring the atomic ions while they are being provided to the trap 270 and/or after they have been provided to the trap 270. In an aspect, the imaging system 230 can be implemented separate from the optical and trap controller 220, however, the use of fluorescence to detect, identify, and label atomic ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of a processor or processing portion of the QIP system 200. That is, the trap 270 may be considered at the core of the processing operations of the QIP system 200 since it holds the atomic-based qubits that are used to perform the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using the chamber 250, which is configured as a ultra-high vacuum such that the QIP system can perform high-fidelity gate operations, for example.

Figure 3:
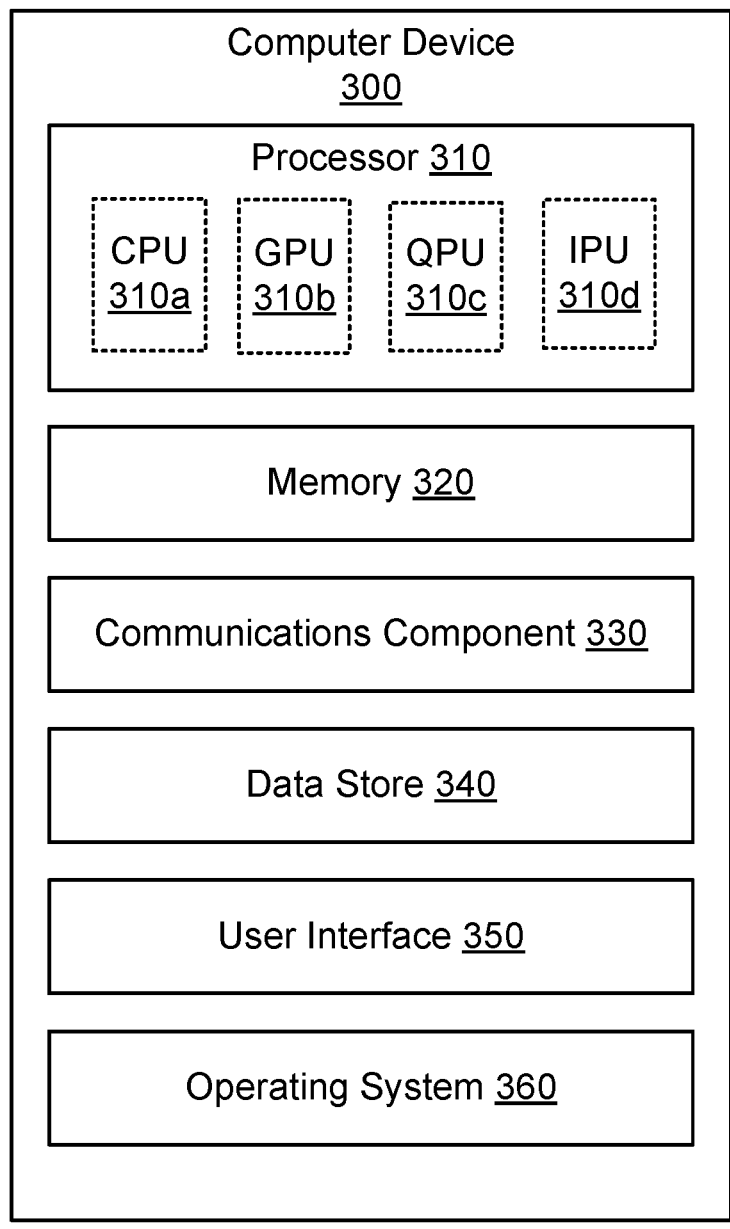
FIG. 3 illustrates an example of a computer device in accordance with exemplary aspects of this disclosure.

Referring now to FIG. 3 shown below, illustrated is an example of a computer system or device 300 in accordance with aspects of the disclosure. The computer device 300 can represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single or multiple set of processors or multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300).

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

As described above, an ultra-high vacuum chamber for an ion trap package is provided according to an exemplary aspect. In particular, internal walls of the enclosure of the vacuum chamber (e.g., the lid, package, or the like) are conditioned so that the internal walls become an adsorbing surface (or gettering surface). For example, the internal walls can be conditioned by sublimating getter materials (such as titanium or barium) on the internal surface, while maintaining the pristine conditions until the vacuum chamber is fully sealed. In an exemplary aspect, this is performed by providing a source of such material in the processing chamber, and providing a mechanism to spread the material over the internal walls and "activate" the material. For example, a titanium sublimation pump can be configured in which such getter materials (e.g., titanium or barium) are provided in the enclosure, and the mechanisms is provided to coat the inner walls periodically, for example, by thermal sublimation or laser ablation.

FIG. 4 illustrates a flowchart 400 for manufacturing a vacuum chamber for the QIP system in accordance with exemplary aspects of this disclosure. In general, a processing vacuum chamber is provided, which is a larger (in size) vacuum chamber in which the vacuum chamber for the QIP system is to be prepared.

Initially, at step 405, a lid (which is configured for the final vacuum chamber) is inserted into the processing vacuum chamber. In this aspect, the lid includes a shadow mask on one or more windows of the lid. Moreover, the lid may optionally be inserted into the processing vacuum chamber by load locking the lid without venting the processing vacuum chamber. The lid may also include an active ion pump integrated thereon that can be configured to remove inert gas molecules from the vacuum chamber.

Next, at step 410, a getter material, such as a simple metal like titanium (Ti) and barium (Ba), or a non-evaporable getter ("NEG") material, is applied to inner walls of the lid (or other components of the vacuum container). That is, step 410 involves the coating of the inside of the lid with the getter material. During this step, the shadow mask is provided and configured to "cover" one or more optical windows while such material deposition (using evaporation, sublimation, ablation, and the like) is performed for the getter material. In an exemplary aspect, the shadow masks are either temporarily applied to or are permanent structures of the enclosure while such material deposition is performed to secure this protection. In an exemplary aspect, the coating of the lid with the getter material effectively activates the getter material to spread over the inner surface of the lid to be an adsorbing surface, which will in turn increase the vacuum pressure of the final vacuum chamber for the QIP system. Advantageously, the resulting vacuum chamber is configured as a ultra-high vacuum such that the QIP system can perform high-fidelity gate operations and at room temperature while reducing collision rates to minimize ion chain reordering events and loss of ions from the trap.

Additionally, the method may include removing of the inert gas molecules by ionizing the inert gas molecules and driving the inert gas molecules into the inner surface of the lid that is coated by the getter material. Optionally, the method may also include applying at least one of a magnetic field and electric field (e.g., using the ion pump or an external component of the QIP system) against the surface of the lid that is coated by the getter material. Alternatively, or in addition thereto, the method may include striking a local plasma using laser ablation (e.g., using the lasers and optical system described above with respect to FIGS. 2 and 3) to drive the inert gas molecules into the inner surface of the lid that is coated by the getter material.

At step 415, the one or more shadow masks can be removed from the one or more optical windows (assuming it is not a permanent structure). Then, at step 420, an ion trap package can be inserted into in the processing vacuum chamber and welding the lid on a top of the ion trap package to prepare the vacuum chamber. In this regard, the ion trap package may be formed by mounting the ion trap on a ceramic package outside the processing vacuum chamber. The ion trap package is then inserted into the processing vacuum chamber. In an optional aspect, the method can further include surface processing the ion trap package before the lid is welded (or soldered or brazed) to the top thereof to reduce anomalous heating as described.

In an exemplary aspect, the lid may include a groove and the lid can be attached to the ceramic package of the ion trap package by sealing (e.g., hermetically sealing), using a metal sealant (e.g., indium), the groove of the lid to the ring frame on the ceramic package. The metal sealant in the groove creates a vacuum seal between the lid and the ion trap package in an ultra-high vacuum environment that is realized by the larger processing vacuum chamber (i.e., a vacuum assembly chamber) that is configured to seal the vacuum enclosure using thermocompression of the metal sealant in the groove matching the ring frame. The active ion pump integrated with the lid (as described above) is used to remove the inert gas molecules (such as He) from the chamber volume.

Finally, at step 425, the prepared vacuum chamber can be removed from the processing vacuum chamber and connected to the quantum computing system, for example, as an implementation of vacuum chamber 250 as described above with respect to FIG. 2. In addition, the prepared vacuum chamber can be configured as a ground connection for the ion trap package when it is attached as part of the large QIP system.

Importantly, the materials for the vacuum enclosure are provided to improve the pressure therein and the system performance. In an exemplary aspect, to reduce outgassing from the inner surface of the vacuum chamber, materials can be utilized with low outgassing surfaces, such as titanium, ceramic material like aluminum oxide (sapphire in single-crystal form), aluminum nitride, and the like. These materials are configured to prevent molecules from permeating therethrough, and in many cases (like titanium), the surface is actually a getter material, meaning that the gas molecules adsorb to the surface.

Moreover, to reduce the permeation of small gas molecules, one or more of the optical windows can use a low-permeation glass or single crystal material in an exemplary aspect.

In an exemplary aspect, the components described above can be baked at high temperatures in an ultra-high vacuum environment without incurring damages or cracks in the welded or brazed seals between the optical windows and the metallic lid. This is accommodated by strain relief structures to the window-lid interface that is designed to withstand the thermal stress associated with increasing the temperature to the highest baked temperature down to the operating temperatures of the package. It should be appreciated that using special materials, such as the NEG materials within the enclosure may require an activation process at elevated temperatures, which may not be readily available in the small form-factor packages (e.g., the final processed vacuum chamber for the QIP system). In these cases, the NEG material should be activated in the ultra-high vacuum assembly chamber before the enclosure is fully assembled by welding the lid to the ion trap package.

Figure 5:
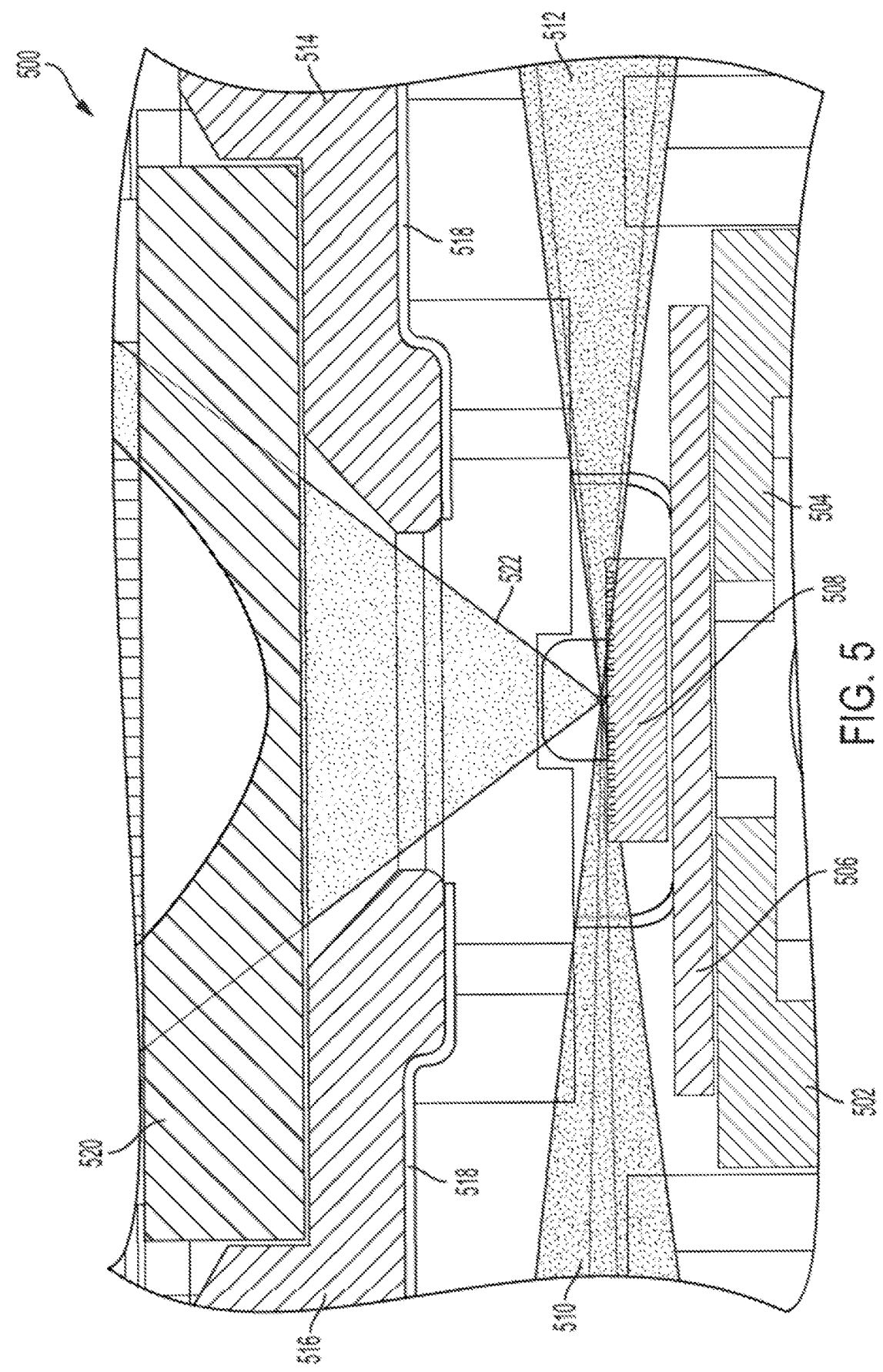
FIG. 5 illustrates a block diagram of the vacuum chamber integrated with a portion of the QIP system in accordance with exemplary aspects of this disclosure.

FIG. 5 illustrates a block diagram 500 of the vacuum chamber integrated with a portion of the QIP system in accordance with exemplary aspects of this disclosure. It should be appreciated that the block diagram 500 illustrates the vacuum chamber after it has been processed (e.g., manufactured or prepared) according to the method described above with respect to FIG. 4.

As shown, the block diagram 500 generally includes the vacuum chamber that can be mounted to a vacuum package mount and/or ceramic pin grid array (CPGA), which is illustrated as a mounting structure 502 and 504, for example. An interposer chip 506 can be coupled to the mounting structure 502 and 504 after the processing is complete and the ion trap 508 can be mounted to the interposer chip 506 to provide an ion trap package. As shown, the small hashes on the ion trap 508 represent the trapped ions, which can correspond to ions 106a to 106d as described above with respect to FIG. 1.

Moreover, the vacuum chamber is created by the lid, which is illustrated as lid portions 514 and 516 with at least one window 520, with the lid being coupled to a top of the ion trap package (e.g., trap 408 and interposer). The vertical cone 522 represents a detection light as described above that goes through optical window 520. Moreover, the outgoing horizontal cones 510 and 512 are light cones (e.g., generated by Raman lasers) for addressing the ions of the ion trap 508. The light cone 510 is focused through an optical window (not shown) towards the ion(s) to be addressed (e.g., from the left side) and similarly the light cone 512 is focused through the optical window (not shown) towards the ion(s) to be addressed (e.g., from the right side).

As described above, during processing a coating material 518 can be activated to coat an inner surface of the lid (i.e., lid portions 514 and 516) that is facing the ion trap 408. Moreover, according to an exemplary aspect, the coating material is a getter material that is at least one of a non-evaporable getter (NEG), titanium (Ti) and barium (Ba). As also described above, a metal sealant can be provided that seals a groove of the lid to a ring frame on the ion trap package. When the vacuum structure is mounted to mounting structures 502 and 504 of the QIP system, the prepared vacuum chamber can be configured as a ground connection for the ion trap package (i.e., the ion trap 508 and interposer 506). By providing the coating material 518 on the lid portions 414 and 416 of the overall inner surface of the lid, the prepared vacuum chamber (i.e., enclosure) configures the ion trap package to execute a quantum computing operation at room temperature, eliminating the need for a cryogenic system.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for preparing a vacuum chamber for a quantum computing system, the method comprising:
   inserting, into a processing vacuum chamber, a lid having a shadow mask on at least one window of the lid;
   coating the inside of the lid with a getter material;
   removing the shadow mask from the at least one window; and
   providing an ion trap package in the processing vacuum chamber and welding the lid on a top of the ion trap package to prepare the vacuum chamber.

2. The method according to claim 1, further comprising removing the prepared vacuum chamber from the processing vacuum chamber and connecting the prepared vacuum chamber to the quantum computing system.

3. The method according to claim 1, wherein the inserting of the lid into the processing vacuum chamber further comprising load locking without venting the processing vacuum chamber.

4. The method according to claim 1, further comprising surface processing the ion trap package before the lid is welded to the top thereof to reduce anomalous heating.

5. The method according to claim 1, wherein the providing of the ion trap package further comprises mounting the ion trap on a ceramic package to provide the ion trap package outside the processing vacuum chamber and inserted the ion trap package into the processing vacuum chamber.

6. The method according to claim 5, further comprising sealing, by a metal sealant, a groove of the lid to a ring frame on the ceramic package.

7. The method according to claim 1, further comprising removing, by an active ion pump integrated with the lid, inert gas molecules from the vacuum chamber.

8. The method according to claim 7, wherein the removing of the inert gas molecules comprises ionizing the inert gas molecules and driving the inert gas molecules into a surface of the lid that is coated by the getter material.

9. The method according to claim 8, further comprising applying at least one of a magnetic field and electric field against the surface of the lid that is coated by the getter material.

10. The method according to claim 8, further comprising striking a local plasma using laser ablation to drive the inert gas molecules into the surface of the lid that is coated by the getter material.

11. The method according to claim 1, wherein the coating of the lid with the getter material comprises conditioning an inner surface of the lid to be an adsorbing surface by sublimating the getter material on the inner surface.

12. The method according to claim 1, wherein the coating of the lid with the getter material comprises activating the getter material to spread over an inner surface of the lid to be an adsorbing surface.

13. The method according to claim 1, wherein the getter material is at least one of a non-evaporable getter (NEG), titanium (Ti) and barium (Ba).

14. The method according to claim 1, further comprising configuring the ion trap package to operate a quantum computing operation at room temperature by providing the ion trap package to prepare the vacuum chamber.

15. The method according to claim 1, further comprising reducing a pressure in the processing vacuum chamber before coating the lid with the getter material.

16. The method according to claim 2, wherein the connecting of the prepared vacuum chamber to the quantum computing system further comprises configuring the prepared vacuum chamber as a ground connection for the ion trap package.

* * * * *